Aug. 7, 1951   A. M. HEXDALL   2,563,242
FASTENER FOR SHEET METALS
Filed July 17, 1948

INVENTOR.
Andrew M. Hexdall
BY Carlsen, Pitzner, Hubbard & Wolfe
attys.

Patented Aug. 7, 1951

2,563,242

UNITED STATES PATENT OFFICE 2,563,242

FASTENER FOR SHEET METALS

Andrew M. Hexdall, Morris, Ill.

Application July 17, 1948, Serial No. 39,348

1 Claim. (Cl. 248—317)

The invention relates to fasteners generally, and more particularly to fasteners for making connections with sheets of metal or other relatively thin, stiff sheet material.

One object of the invention is to provide a fastener of the above general character which can be applied quickly and easily, and which when applied to a sheet of material provides a positive connection therewith and effectually prevents relative lateral or transverse movements between the sheet and the fastener.

Another object is to provide a fastener for use with sheet material which is simple in construction, inexpensive to manufacture, yet efficient and reliable in operation.

Other objects and advantages of the invention will become apparent from the following detailed description of the preferred embodiments illustrated in the accompanying drawing, in which.

Figure 1:
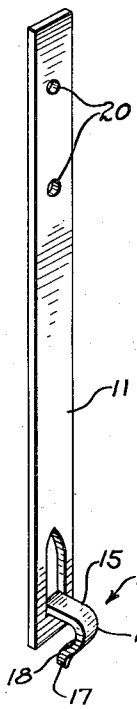
Figure 1 is a perspective view of a fastener embodying the features of the invention.

By way of illustration the improved fastener has been shown in a form which lends itself readily to production from sheet metal by a simple stamping operation. In general, the fastener comprises a hook-like element 10 disposed adjacent one end of an elongated relatively rigid body 11. As hereinshown, the body 11 is in the form of a thin, flat strip of sheet metal and the element 10 is in the nature of a prong struck out from the strip and then bent into appropriate configuration by suitable die forming or like operations.

To condition a structure, including a flat sheet-like member 12 for attachment of the fastener, it is only necessary to pierce the member so as to form a slot 13 therein having a length and width corresponding approximately to the comparable dimensions of the base of the prong forming the element 10. The element is positioned on the body 11 so that it may be inserted in the slot 13 while the body is held substantially normal to the plane of the member 12 and it is shaped and proportioned so that it acts automatically to draw itself into the slot 13 and the body 11 into face-to-face engagement with the member 12 when the body is rocked or swung toward the plane of the member.

In order that the hook element 10 may function in the manner described, it is formed with a substantially straight shank portion 15 projecting from one face of and disposed substantially perpendicular to the body 11 adjacent one end thereof. The shank portion 15 merges into an arcuate or C-shaped intermediate portion 16 turned toward said one end of the body and terminating in a reversely bent tip portion disposed generally parallel to the body.

Figure 4:
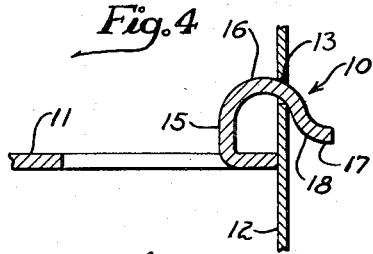
Figs. 4, 5 and 6 are sectional views showing successive steps in the attachment of the fastener to a sheet-like member.
Figure 5:
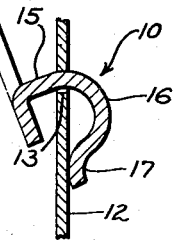
Figure 6:
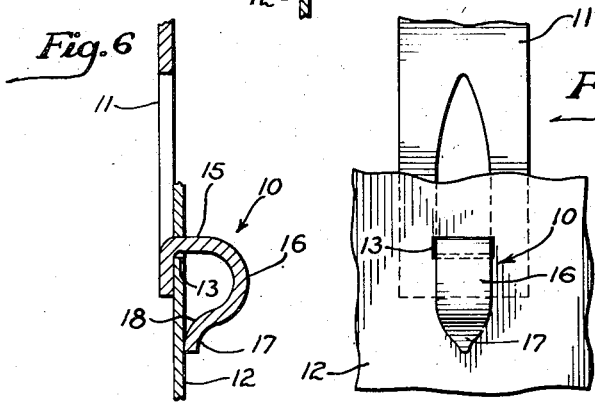
Figure 7:
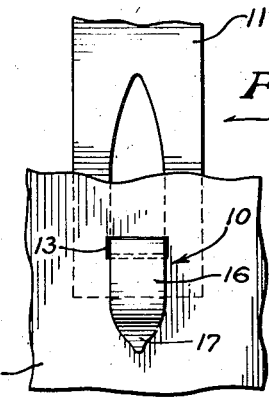
Fig. 7 is a view of the inside face of the sheet with the fastener applied thereto.

The tip portion 17 of the hook element and the adjacent part of the intermediate portion 16 are dimensioned so as to project beyond the end of the body 11 so that they may be inserted within the slot 13 while the body is held approximately normal to the plane of the member 12, as shown in Fig. 4. The tip 17 is bent out so as to locate it in spaced relation to the body 11, the spacing being approximately equal to the thickness of the member 12. The underside of the tip is rounded to form a cam surface 18 adapted to coact with the inner face of the member as the body 11 of the fastener is rocked toward the plane of the member. The camming action of the tip is such that the shank portion 15 of the hook element is gradually drawn into the slot 13, as shown in Fig. 5, and finally the body 11 is brought into face-to-face engagement with the member, as shown in Fig. 6. This action greatly facilitates the attachment of the fastener and eliminates any possibility of tearing or otherwise damaging the sheet member in such attachment.

In addition to facilitating attachment to the fastener, the hook element 10 affords a positively locked connection between the fastener and the member 12. By reason of their spacing and their location with respect to the member 12, the tip 17 and the body 11 define opposed abutments operative to prevent relative movement of the member and the fastener in a direction normal to the plane of the member. Furthermore, the shank portion 15 of the hook element is dimensioned to fit snugly within the slot 13, thus enabling it to prevent relative movement of the member and the fastener in any direction in the plane of the member. Thus the fastener and member remain securely locked together at all times as long as the body 11 is maintained substantially parallel to the plane of the member 12. However, the fastener may be readily detached from the member 12 by simply rocking it toward the position shown in Fig. 4 and then withdrawing the hook element from the slot 13.

Figure 2:
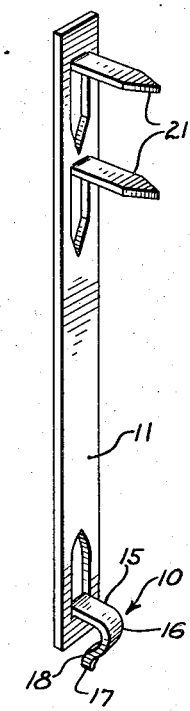
Fig. 2 is a perspective view showing the improved fastener as applied to a duct hanger of well known type.
Figure 3:
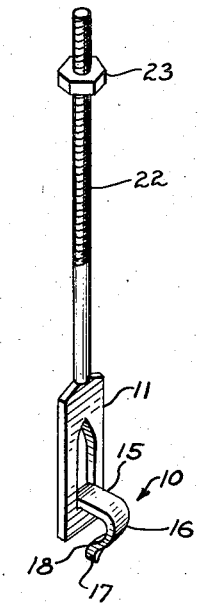
Fig. 3 is a perspective view showing the improved fastener applied to another type of hanger.

It will be appreciated that the body portion 11 of the fastener may be provided with suitable means for anchoring it to a support or other structure. In the form shown in Fig. 1 the body 11 is provided at the end remote from the hook element 10 with two holes 20 for the reception of screws or bolts. In the form shown in Fig. 2, the fastener is incorporated in a duct hanger of the general type disclosed in my prior Patent No. 2,264,666, granted December 2, 1941. In this type of hanger the body 11 is formed with integral prongs 21 adapted to be driven into a beam or other support for anchoring the hanger thereto. Fig. 3 shows the body 11 as terminating in a cylindrical end portion 22 screwthreaded for the reception of a nut 23 by which the fastener may be anchored to a support.

It will be apparent from the foregoing that the invention provides a fastener of novel and advantageous construction which can be applied very quickly and easily to structures of sheet material. The fastener provides a positive connection effective to prevent substantially all relative movements between the fastener and the member to which it is attached. It is simple in construction, inexpensive to manufacture and yet very efficient and reliable in operation. While it has been shown in a form particularly well suited for use in duct hangers or the like, it will be appreciated that it may be used under a wide variety of conditions for effecting a strong and positive connection with structures of sheet material.

I claim as my invention:

A fastener for sheet material comprising, an elongated flat body, anchoring means adjacent one end of the body for attaching said body to a support, an integral hook-like element adjacent the other end of the body, said element having a shank portion disposed substantially perpendicular to said body, an arcuate intermediate portion turned toward said other end of the body and a reversely bent tip portion projecting beyond the end of the body and generally parallel thereto, a sheet of material to be suspended from said fastener and having a slot therein near one of its marginal edges, said tip portion being insertable in said slot while said body is disposed approximately normal to the plane of said material and being operative as the body is rocked toward said plane to engage the inner surface of said material and draw the shank portion of the hook element into said slot, said body and the tip portion of the hook element being spaced apart a distance corresponding approximately to the thickness of said material and constituting opposed abutments restricting relative movements of said material and body perpedicular to the plane of the body, the shank portion of said hook element being dimensioned to fit within said slot so as to restrict relative movement of said material and the body in any direction in the plane of the body.

ANDREW M. HEXDALL.

REFERENCES CITED

The following references are of record in the file of this patent:

UNITED STATES PATENTS

| Number | Name | Date |
| --- | --- | --- |
| 799,433 | Bajohr | Sept. 12, 1905 |
| 1,373,097 | Roda | Mar. 29, 1929 |